July 31, 1928. 1,678,904
P. R. GLASS
FASTENER INSERTING MACHINE
Filed March 7, 1924 3 Sheets-Sheet 1

INVENTOR.
Perley R Glass
By his Attorney
Nelson W. Howard

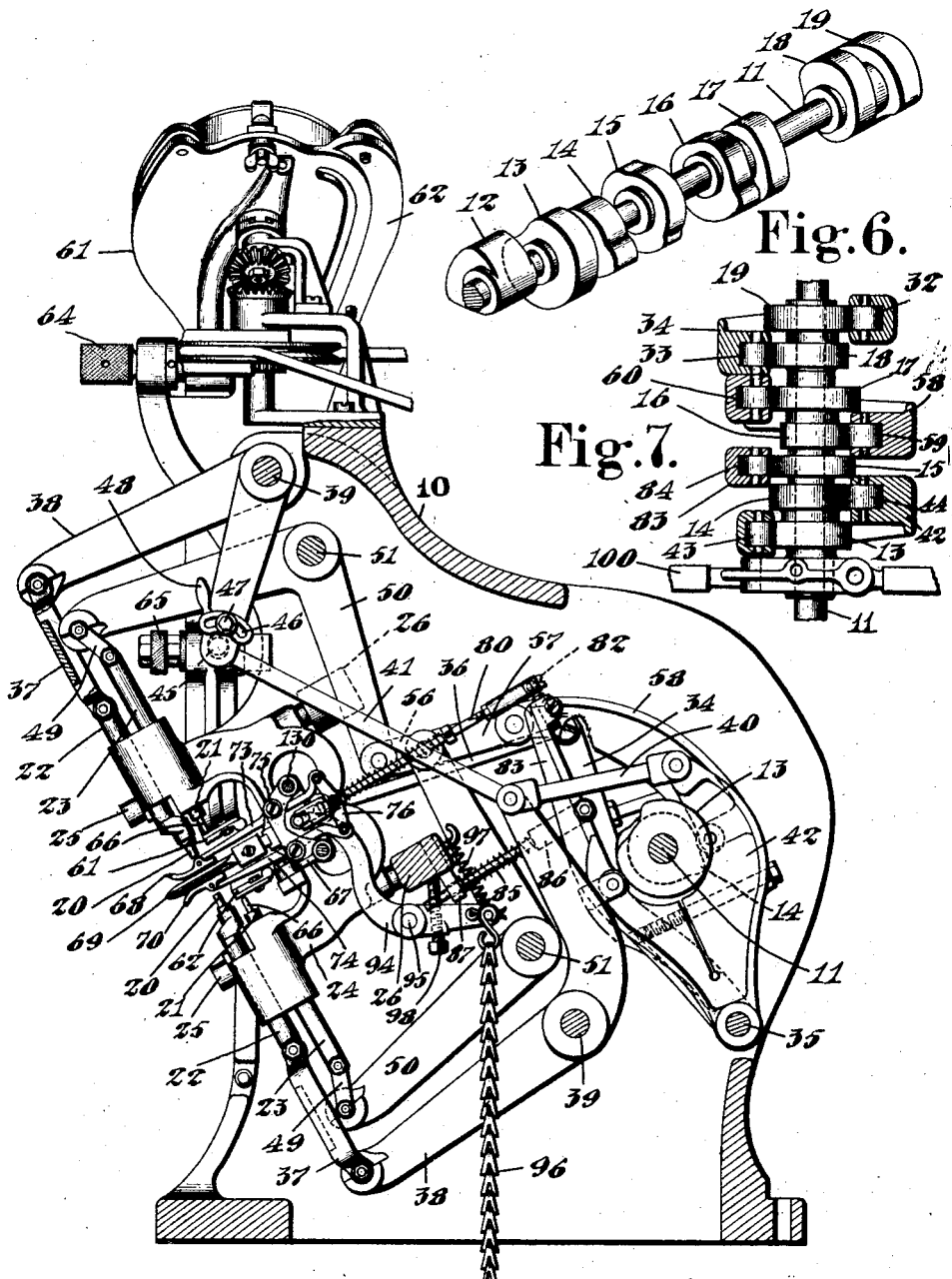

July 31, 1928. 1,678,904
P. R. GLASS
FASTENER INSERTING MACHINE
Filed March 7, 1924  3 Sheets-Sheet 3
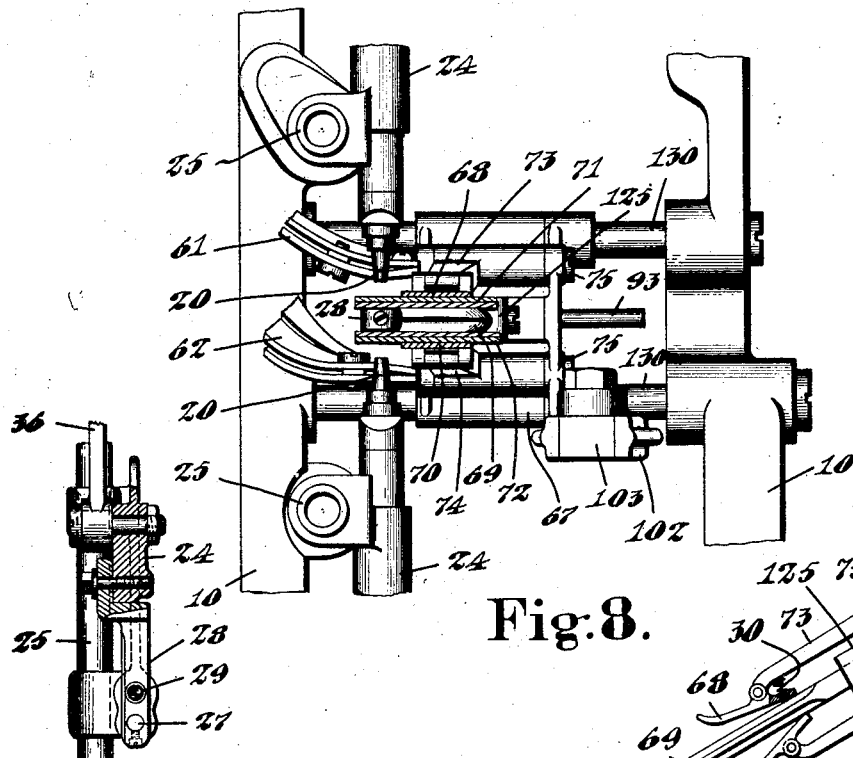
Fig. 8.
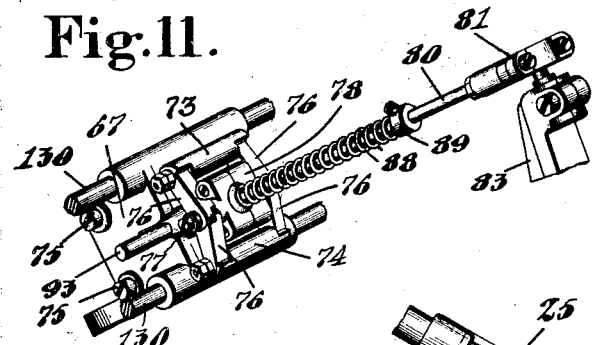
Fig. 11.   Fig. 13.
Fig. 10.
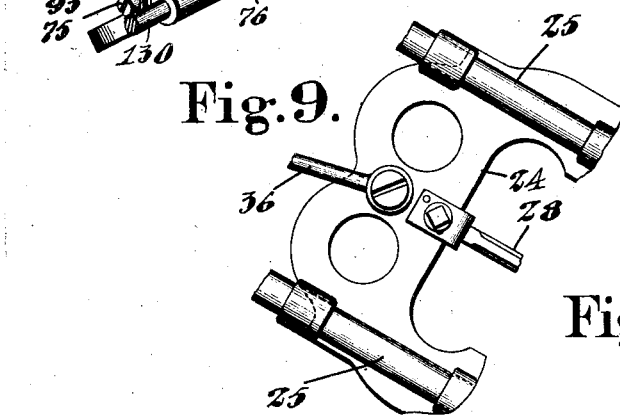
Fig. 9.
Fig. 12.
INVENTOR
Perley R. Glass
By his Attorney,
Nelson W. Howard Patented July 31, 1928.

1,678,904

UNITED STATES PATENT OFFICE.

PERLEY R. GLASS, OF WAYLAND, MASSACHUSETTS, ASSIGNOR TO UNITED SHOE MACHINERY CORPORATION, OF PATERSON, NEW JERSEY, A CORPORATION OF NEW JERSEY.

FASTENER-INSERTING MACHINE.

Application filed March 7, 1924. Serial No. 697,553.

This invention relates to fastener-inserting machines and more especially to machines in which the work is fed step by step to space successive fasteners. In some respects the invention relates particularly to machines of the duplex type, and is illustrated as embodied in a duplex eyeleting machine, but in other respects it is not limited to machines of the duplex type. Nevertheless, since certain features of the invention are of special advantage in a duplex organization for setting eyelets the invention will be described in terms relating thereto Among the objects of the invention are the following: to provide for greater speed of operation, smoother running, that is, less vibration and less noise, to provide for better observation of the work, and in general to provide a more efficient and durable organization than those heretofore in commercial use.

In commercial duplex eyeleting machines as heretofore constructed, the punching tools and the eyelet-inserting tools have been arranged side by side and the latter have been used to feed the work. This feature of organization has required a compound lateral motion of said tools, one component of which is used to shift the inserting tools into register with the punched holes and the other of which is used to feed the work after the eyelets have been inserted and clenched.

To avoid such compound motion it has been proposed to arrange the punches and the eyelet-inserting tools in telescopic relation, thus to maintain the inserting tools always in register with the punches so that they will not require lateral shifting to move them into register with the punched holes. This has necessitated the elimination of the tapered, spring-pressed spindles with which eyelet-inserting tools are usually provided to pick the eyelets from the raceways, and the substitution of punches in their stead, but this proposed organization has proved to be unsatisfactory with respect to taking the eyelets from the raceways and setting them in the work. For the latter purpose the tapered spring-pressed spindles are far superior, since they avoid defective setting and the breaking of machine parts which frequently result from using punches in their stead. In other words, the shape, size and positive actuation necessary in a punch are mechanically antagonistic to the requirements for picking eyelets from a raceway at high speed.

In view of the conditions mentioned, an object of the present invention is to provide an improved organization by which a simple lateral motion of the punches and eyelet-inserting tools may be substituted for the aforesaid compound lateral motion without depriving the eyelet-inserting tools of tapered, spring-pressed spindles.

Accordingly features of the invention consist in providing a raceway for annular fasteners, a fastener-inserting tool having a spindle for picking fasteners from the raceway, a punch separate from the fastener-inserting tool, mechanism for feeding the work relatively to the punch and the fastener-inserting tool, and arranging the punch and the inserting tool to be shifted to a common working position alternately from positions at opposite sides of the specified working position. This feature moreover provides for another that contributes to smooth running and high speed, namely, a simple and relatively short reciprocatory motion to shift the punch and the inserting tool collectively to and from the aforesaid common working position.

Another feature of the invention consists in utilizing the aforesaid shifting motion of the punch and inserting tool to take a fastener from the raceway, thus accomplishing two distinct results with one motion. This feature provides for fixing the raceway instead of reciprocating it, and not only eliminates the usual raceway-operating mechanism, but eliminates one of the most serious causes of vibration.

Still another novel feature consists in organizing punching mechanism, fastener-inserting mechanism and work-feeding mechanism in such relation that no movement of the work will occur between the punching operation and the fastener-inserting operation, and in such relation that the feeding mechanism may be operated to tension the work while the latter is held by one of the other mechanisms.

Other novel features are hereinafter described and claimed and are illustrated by the accompanying drawings.

In the drawings,

Fig. 5 is a vertical section of the machine in a plane from front to rear.

Fig. 6 is a perspective view of the cam shaft and the various cams assembled thereon but spread apart more than they would be in practice, to facilitate illustration.

Fig. 7 is a plan view partly in section showing the various operating levers and the feeding actuator in cooperative relation to their respective cams.

Fig. 8 is a front elevation of the elements adjacent to the working locality.

Fig. 9 is a perspective view of the feed-carriage and mechanism for operating the jaws to clamp the work.

Fig. 10 is a sectional view of a connection by which the clamping jaws may be manually separated to facilitate inserting and removing the work; this connection is shown also in Fig. 5.

Fig. 11 is a plan view of the tool that functions between confronting portions of the work alternately as a punch-block and clenching tool.

Fig. 12 represents a portion of the tool-carriage and the link connected thereto for shifting it.

Fig. 13 shows the clamping jaws open for the reception of the work.

Figures 1, 4:
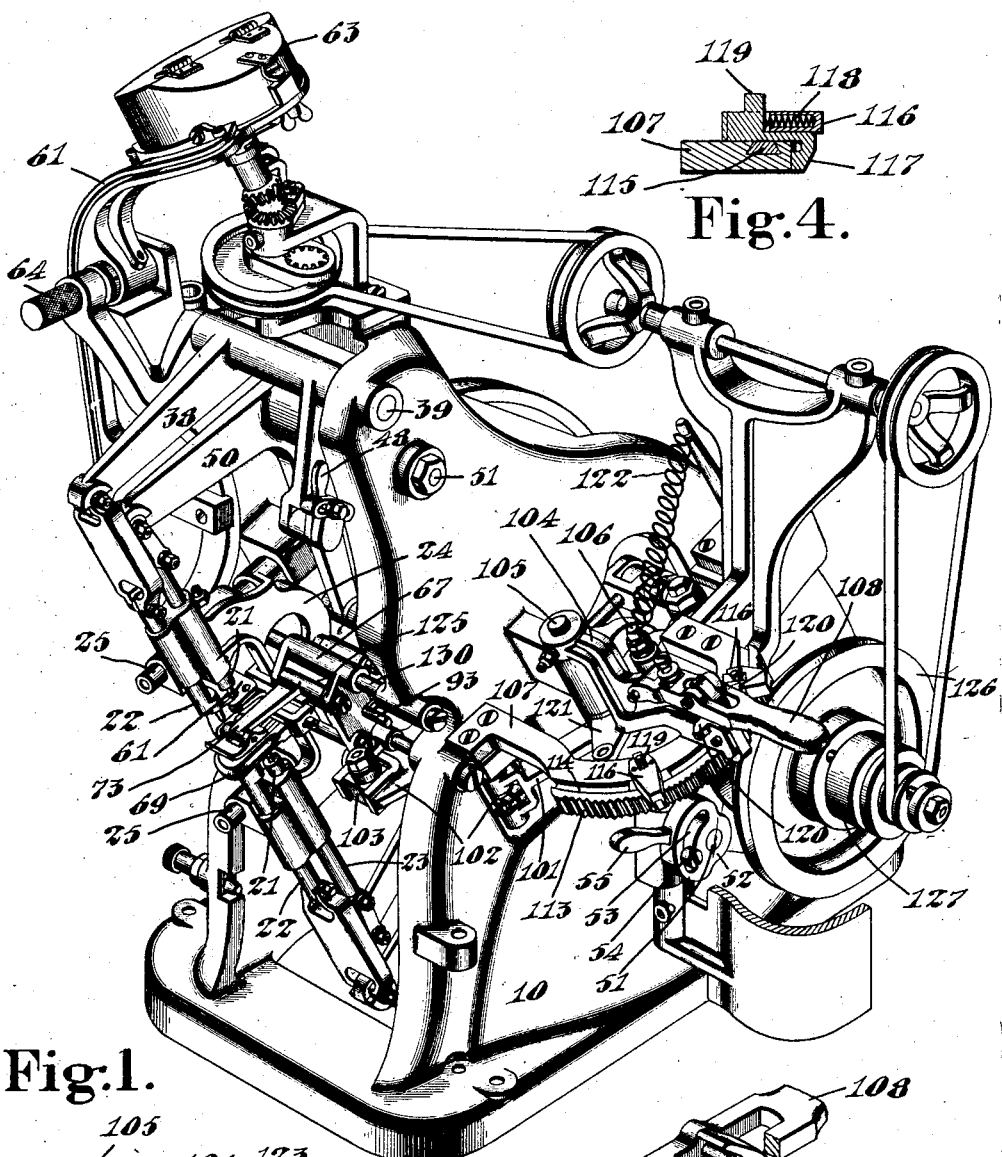
Fig. 1 is a perspective view of a duplex eyeleting machine constructed in accordance with this invention.
Fig. 4 is a sectional view of an adjustable stop for limiting the range of regulation of the feeding mechanism.

The frame 10 of the machine is provided with bearings for a cam shaft 11 (Fig. 5) on which the several cams are arranged as shown by Fig. 6. A double-acting cam 12 reciprocates a feed-carriage positively in opposite directions. Two complemental single-acting cams 13 and 14 act as counterparts to operate the punches. A single-acting cam 15 tightens the clamping jaws by which the work is fed, its counterpart being a spring hereinafter described. Two complemental single-acting cams 16 and 17 are provided to operate the eyelet-inserting tools, and two complemental single-acting cams 18 and 19 are provided to shift the punches and inserting tools alternately to and from a working locality common to both. The punches and inserting tools are thus caused to replace each other at the common working locality.

Two punches 20, 20 (Figs. 1, 5 and 8) are arranged in duplex relation, and two inserting tools 21, 21, commonly called the sets or setting tools, are arranged in a similar relation. These punches and tools are carried respectively by plungers 22 and 23, and the four plungers are arranged to slide in individual bearings afforded by a duplex tool-carriage 24. This carriage is arranged to slide to the front and rear on fixed guide rods 25, 25, the rear ends of which are fastened in portions 26 of the frame 10, the purpose being to shift the punches and inserting tools alternately to and from register with the locality where the work is punched and the eyelets are inserted and clenched. To minimize the shifting movement the punches are offset toward the inserting tools 21 as shown in Fig. 5.

As shown by Fig. 11, a duplex punch-block 27 and a duplex clenching anvil 29 are embedded in a tongue 28 fixed to the tool carriage 24. These elements are arranged to function between confronting portions of the work such as the two quarters of a shoe-upper. The tongue 28 has a slight degree of resilience to equalize the pressure of the punches and also of the setting tools.

The tool-carriage 24 is reciprocated positively to the front and rear to place the punching couples 20 and 27 and the fastener-inserting couples 21 and 28 alternately in a common working locality. Such reciprocation of the carriage 24 is imparted by the cams 18 and 19. These cams engage respectively rolls 32, 33 carried by a lever 34 (Figs. 5 and 7). The lower end of the lever is mounted upon a fulcrum rod 35 and the upper end is connected to the tool-carriage by a link 36 (Figs. 5 and 9).

The plungers 22 carrying the punches are connected by links 37 to bell-crank levers 38, 38, the links being adapted to compensate not only for the angular movement of the levers but also for the shifting of the punches by the carriage 24. The levers 38 are mounted on fulcrum rods 39 fastened in the frame 10. The lower lever 38 is directly connected to a link 40 but the upper lever 38 is connected to said link by an intermediate link 41. The link 40 is reciprocated positively in opposite directions by a yoke lever 42 the lower end of which is mounted on the fulcrum rod 35. Cam rolls 43 and 44 (Fig. 7) carried by the lever 42 engage respectively the cams 13 and 14. The connection between the link 41 and the upper lever 38 comprises an eccentric stud 45 (Fig. 5) by which the punches may be relatively adjusted toward and from each other to regulate their pressure against the punch-block 27. To maintain the eccentric stud in various positions of adjustment it is provided with a head having a curved slot 46. A clamping bolt 47 extends through the slot and is screwed into the lever, and when set up tightly it binds the head against the lever. A handle 48 is formed on the head to provide convenient means by which to adjust it.

The plungers 23 carrying the inserting tools are connected by links 49 to bell-crank levers 50, 50. These levers are mounted on fulcrum rods 51 the upper one of which is fixed in the frame 10 without any provision for adjustment, but the lower one of which is adjustable to regulate the pressure of the inserting tools against the anvil or clenching tool 29. For this purpose the intermediate portion of the lower fulcrum member 51 is eccentric relatively to the end portions, and the end portions are arranged to turn in bearings in the frame 10. A head 52 (Fig. 1) is fixed to one end of the fulcrum member and is provided with a curved slot 53 to receive a clamping screw 54. This screw is screwed into a portion of the frame 10, and when set up tightly binds the head to maintain the fulcrum member in any desired position of adjustment. A handle 55 formed on the head provides convenient means for adjusting the member 51. The two bell-crank levers 50 have arms extending toward each other, which arms are connected by a short link 56 (Fig. 5) so that they will operate in unison. One end of a link 57 is pivotally connected to the link 56 while the other end is pivotally connected to a yoke lever 58 mounted on the fulcrum rod 35. The lever 58 is reciprocated positively in opposite directions by the cams 16 and 17 (Fig. 7), and is provided with cam rolls 59 and 60.

Eyelets are supplied to the inserting tools 21 by fixed raceways 61 and 62 (Fig. 5) arranged in duplex relation. These raceways are rigidly connected to each other and form a detachable unit which includes also a supply hopper 63 from which both raceways receive eyelets. This raceway unit is affixed to the frame 10 by a pin 64 and stud 65 (Figs. 1 and 5). The raceways are arranged at the delivery side of the setting tools 21, 21 and 29, and their outlets (Fig. 1) are at the rear of the setting locality (see also Figs. 5 and 8). The said outlets extend toward the front to enable the inserting tools 21, 21 to remove the eyelets therefrom as said tools move from rear to front. According to the most approved and the commonest usage the inserting tools are provided with spring-pressed spindles 66 (Fig. 5) of tapering formation to pick the eyelets from the raceways and carry them to the work. Any suitable or preferred mechanism may be provided for feeding the eyelets from the hopper 63 to the raceways.

The work-feeding mechanism comprises a carriage 67 (Fig. 13) and three cooperative clamping jaws 68, 69 and 70 carried thereby. This carriage is reciprocated to feed the work from right to left, and is arranged to slide on two fixed guide rods 130. Both ends of each rod are rigidly supported in sockets in the frame 10, the arrangement being shown best by Fig. 8. As shown by Figs. 1 and 5, these rods extend through holes in the tool-carriage 24, but the holes are large enough to provide clearance for the tool-carriage to operate without interfering with the rods.

The intermediate clamping jaw 69 (Fig. 8) is arranged in the same plane and is of the same thickness as the tongue 28 that holds the punch-block and the clenching anvil 29, and is affixed to the carriage 67. It is therefore arranged to function between the two confronting quarters of a shoe-upper and is adapted to cooperate with each of the clamping jaws 68 and 70. In Fig. 8 two work elements are indicated at 71 and 72 and each is represented as comprising two layers through which the eyelets are to be inserted. These work elements may be regarded as the two quarters of a shoe-upper. The clamping jaws 68 and 70 (Fig. 13) are carried by and pivoted to levers 73 and 74 mounted in the feed-carriage on pivots 75. The rear ends of the levers 73 and 74 are connected by two pairs of toggle members 76 (see Fig. 9). The toggle members are connected by pivots 77 to a split block 78 made in two parts for purposes of assembling, the two parts being rigidly connected to each other by screws. The block 78 constitutes a socket member of a ball-and-socket joint, the ball member of which is indicated at 79 (see Fig. 10). A hole is bored through the center of the ball member 79 to provide a bearing in which a rod 80 may slide. The rear end of this rod is provided with a socket member 81 which embraces a ball formation 82 (Fig. 5) on a stud carried by an operating lever 83. The lower end of the lever 83 is mounted on the fulcrum rod 35 (Fig. 5) while a cam roll 84 carried by the lever 83 engages the cam 15 (Fig. 7). The roll is maintained in engagement with the cam by a compression spring 85 (Fig. 5) and a plunger 86 on which the spring is arranged. The rear end of the plunger is pivotally connected to the lever 83 while the forward end, which is a cylindric rod, is arranged to slide in a fixture 87 fastened to the frame 10.

The effective connection between the rod 80 and the clamping jaws is provided by a compression spring 88 and a collar 89 (Fig. 9), the collar being fixed to the rod 80 by a set-screw at any desired position according to the clamping effect desired. For example, the collar may be adjusted to maintain any desired degree of minimum compression of the spring 88 or, if preferred, it may be adjusted to relieve the compression entirely when the link is fully retracted. I prefer, however, to adjust the collar to maintain continuous compression of the spring, so that the clamping jaws will have sufficient pressure on the work during the retractory movement of the feed-carriage to eliminate wrinkles and to take up slack in the work. It is obvious, however, that by setting back the collar 89 to relieve the spring from all compression during the retractory movement of the feed-carriage the work will be relieved from all drag counter to its direction of feeding movement.

The ball-and-socket joints, by which the rod 80 is connected at one end to the operating lever 83 and at the other end to the block 78, compensates for the angular movement imparted to the rod by the movements of the feed-carriage, while the spring 88 at the same time is effective to compensate for the slight increase and decrease of the distance between the collar 89 and the ball member 79 incidental to the movements of the feed-carriage.

The machine is also provided with manually operable means for separating the clamping jaws 68 and 70 to facilitate inserting and removing the work. For this purpose the forward end of the toggle-operating rod 80 is provided with a head 90 (Fig. 10) and has telescopic connection with a sleeve 91. The sleeve is formed with two diametrically opposite notches 92 through which a pin 93 extends. This pin is affixed to a lever 94 which is mounted on a fulcrum member 95 (Fig. 5). The upper end of a chain 96 is connected to this lever and its lower end may be connected to a treadle for drawing it down. When the chain is drawn down it causes the pin 93 to shift the sleeve 91 to the rear. The sleeve therefore shifts the ball member 79 to the rear in opposition to the applied stress of the spring 88. As the ball member moves to the rear it operates the toggle members 76 to separate the clamping jaws. This construction is such that the automatic mechanism for operating the toggle members and the manually operable mechanism for the same purpose do not interfere with each other. When the force applied to the chain 96 is removed the lever 94 is returned to its initial position by a tension spring 97. To prevent the pin 93 from moving so far out of the notches 92 as to lose operative connection the lever 94 is provided with an adjustable stop-screw 98 adapted to engage the fixture 26.

As shown by Fig. 13, a light compression spring 30 is arranged to raise the forward end of the jaw 68 when the jaws are opened manually for the reception of the work. The jaw 70 does not need a spring because it is so hung that its forward end is separated by gravity from the intermediate jaw.

The illustrated mechanism for reciprocating the feed-carriage is substantially like the corresponding mechanism shown and described in my copending application Serial No. 469,666, filed May 14, 1921, and is therefore not fully illustrated in the present application. The present invention comprises, however, certain improved features relating to the controlling mechanism by which the feeding mechanism may be regulated to vary the length of the feeding steps, these improved features being illustrated herewith in connection with enough of the work-feeding mechanism to disclose the essential co-operative relations.

Those elements of the work-feeding mechanism that are substantially identical with the corresponding elements disclosed in the aforesaid application comprise a double-acting cam 12 (Fig. 6), a reciprocatory bar 100 (Fig. 7) formed to straddle the cam and to be reciprocated positively in opposite directions, a series of links, one of which is indicated at 101 in Fig. 1, for transmitting motion from the bar, and a bell-crank lever 102 which receives motion from the link 101 and which has a forked portion straddling a block 103 carried by the feed-carriage. Another element which is functionally identical with a similar element shown in said former application is an adjustable feed-regulator 104 arranged to swing about a stationary pivot 105. The regulator 104 carries a pivot stud 106 on which one link of the mechanism is arranged to swing, and the organization is such that by shifting the regulator 104 to change the position of the stud 106 the links vary the amplitude of motion imparted to the bell-crank lever 102 and therefore vary the length of the movement imparted to the feed-carriage.

The regulator 104 is arranged to swing on a fixed sector 107 which, in prior machines, has been provided with a large number of holes to receive two stop pins for arresting the regulator at two predetermined positions. In the practical use of the aforesaid prior construction the stop pins frequently become disengaged from the plate in which they are inserted and when this happens the machine not only loses a potential regulation but sometimes the operative will shift the regulator without knowing that the pin has become disengaged and will spoil an article of work in consequence thereof. Factors contributing to the difficulty just mentioned are the fact that the stop pins are tapered and become loosened by vibration of the machine, the fact that the plate or sector in which the pins are inserted is inclined rather than horizontal, and the fact that the regulator has a tendency to dislodge the pins when it is arrested by them.

To guard against the difficulty above mentioned and also to provide more convenient means for shifting the regulator, I have provided the improved features which will now be described. Instead of providing the regulator 104 with an integral portion as a handle by which to move it from one position to another I provide it with a relatively movable handle 108 (Figs. 1 and 2) and utilize the relative movement thereof to operate a member 109 (Fig. 3) by which the regulator is automatically locked in any position at which it is left. The handle 108 is connected to the regulator by a pivot pin 110 (Fig. 2) arranged at right angles to the fulcrum member 105 about which the regulator swings. So far as moving the regulator is concerned the handle 108 is, in effect, the equivalent of an integral portion thereof, the relative movability of the handle having no effect excepting to move the locking member 109. The locking member is carried by the regulator and is mounted on a pivot pin 111. The lower end of the locking member 109 is provided with one or more teeth 112 adapted to enter between and cooperate with locking teeth 113 formed on the outer edge of the sector 107. The upper end of the locking member 109 projects through a hole in the handle and is provided with a notch which is occupied by a pin 128 carried by the handle. A compression spring 129 carried by the regulator normally raises the handle and thereby causes the pin 128 to hold the lower end of the locking member in interlocked relation with the teeth of the sector. To unlock the regulator the operative has merely to let the weight of his hand rest on the handle 108, the spring 129 being so light that it will yield to the weight of the hand and permit the pin 128 to retract the locking member from engagement with the teeth on the sector. The regulator is thus released so that it may swing about the pivot member 105 to vary the regulation of the feeding mechanism, and the locking member is maintained out of engagement with the sector by the weight of the hand resting on the handle while the latter is being moved to change the position of the regulator. This feature is designed to utilize the natural tendency of the hand to disengage the locking member and therefore relieves the operative from any special effort either to release the regulator prior to shifting it or to lock it in the new position.

The aforesaid improved feature for arresting the regulator at predetermined positions of adjustment comprises one or more adjustable stops one of which is shown in section by Fig. 4. Fig. 1 includes two such stops one of which is arranged to arrest movement in one direction while the other is arranged to arrest movement in the opposite direction. To guard against accidental displacement and dislodgment of the adjustable stops the sector 107 is provided with a dovetail slot 114. Each stop device comprises a dovetail block 115 adapted to slide in the groove 114. A holder 116 is riveted or otherwise permanently fixed to the block 115 and is arranged to slide on the upper surface of the sector to provide means for holding a locking member 117. This locking member is arranged to slide relatively to the elements 115 and 116 and is provided with one or more locking teeth adapted to be interlocked with the teeth 113 on the sector. A socket is bored in the member 116 to receive a compression spring 118, said spring being arranged to act on the locking member to maintain the latter normally in interlocked relation with the teeth 113. A knob 119 is formed on the locking member to provide convenient means by which it may be moved to disengage it from the teeth 113. While holding the locking member out of engagement with the teeth 113 the device may be shifted lengthwise of the slot to any desired position where it will be automatically locked when the operative removes his hand from it.

Inasmuch as the teeth 113 as well as those on the locking member 117 are inclined or beveled to facilitate automatic locking in any position to which the stop device may be moved, it might be possible to displace the device by a too forcible impact or pressure from the regulator, but to guard against this the invention provides means for automatically tightening the locking member whenever the regulator 104 is arrested by it. For this purpose the regulator is provided with two ears 120 one on each side, and each ear is provided with an inclined face arranged to engage the knob 119 with the effect of a cam tending to seat the teeth of the locking member more forcibly against the teeth 113 incidentally to arresting the movement of the regulator.

Figures 2, 3:
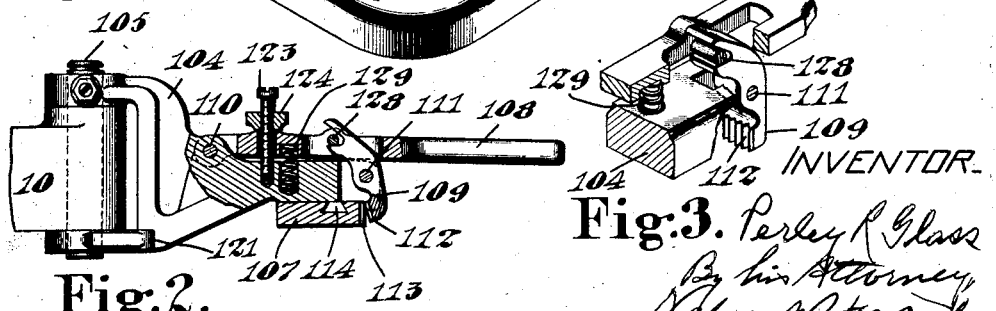
Fig. 2 is a view, partly in elevation and partly in section, of means for regulating the work-feeding mechanism.
Fig. 3 is a perspective view partly in section of a device included in Fig. 2 for maintaining the feeding mechanism in various positions of regulation.

Some styles of work require a series of eyelets with two different spacings. For example, some boots require relatively close spacing of the eyelets in the lower portion and greater spacing between the eyelets in the upper portion. The illustrated machine is designed to provide for a change of spacing while it is operating, so that the entire series of eyelets may be inserted without interruption at the point or points where the change of spacing occurs. To provide for this mode of operation the regulator 104 is formed with an arm 121 (Fig. 1) adapted to be connected to a rod (not shown) running to a treadle connection as in my prior constructions. Furthermore, a tension spring 122 attached at its rear end to a fixture and at its forward end to the stud 106 which controls the extent of movement of the feed-carriage is provided to maintain the regulator normally in a predetermined position against the rear stop or abutment interlocked with the sector 107. When the spring 122 is in use it is not necessary to use the locking member 109, and accordingly the regulator is provided with means for maintaining this locking member out of engagement with the teeth 113. For this purpose a screw 123 (Fig. 2) is fixed in the regulator and projects through a hole in the handle 108, while a thumb nut 124 on the screw is arranged to maintain the handle in a position that will keep the locking member retracted as shown by Fig. 2. The regulator may therefore be free to respond to the treadle mechanism connected to the arm 121 subject only to the stress of the spring 122. Under such conditions the front and rear stop devices will determine the range of movement of the regulator.

The machine is provided with a duplex edge gage 125 (Fig. 1) substantially like that disclosed in my aforesaid application. This edge gage is carried by the intermediate clamping jaw 69 and is adjustably fixed thereto by a screw so that it may be adjusted to the front and rear. The gage has a cleft through which the intermediate clamping jaw projects.

The cam shaft 11 is provided with a suitable disconnectible clutch the driving member of which includes a pulley 126 intended to be driven continuously. The controlling mechanism also controls a brake by which the shaft is stopped at a predetermined point in its cycle. Since these controlling elements do not constitute features of the present invention they are not illustrated excepting that the disconnectible clutch is represented generally at 127 in Fig. 1.

Figs. 1, 5 and 8 show the various mechanisms in their respective initial positions. When the machine is stopped the punches 20, 20 and inserting tools 21, 21 are retracted; the tool-carriage 24 is in its rear position; the punches are in the punching and setting locality; the spindles 66 of the inserting tools are in register with the eyelets at the delivery ends of the raceways; the feed-carriage is in its extreme left-hand position in which the clamping jaws are relatively close to the punching and setting locality; and the pressure of the jaws 68 and 60 against the intermediate jaw 69 is relatively great.

To facilitate inserting the work the operative will depress the treadle to which the chain 96 is attached, thereby operating the toggle members 76 to open the jaws 68, 70. Having placed the work in the desired position to receive the first pair of eyelets, the clamping jaws will be closed and the clutch may be tripped to start the machine. I prefer to use a clutch of the type that will continue to drive so long as the treadle is held down and which will cause the machine to stop at the end of the cycle in which the treadle is released. When the machine starts to operate, the first result is that the punches form the holes for the reception of the eyelets and immediately recede from the work, the latter being clamped by the feeding jaws in proximity to the punching locality so that it will be stripped from the punches as the latter recede. In the meantime the inserting tools advance far enough to insert the spindles 66 through the leading eyelets in the raceways, and when the spindles have been inserted far enough to fit tightly in the eyelets the movement of the inserting tools toward each other diminishes in speed and the tool-carriage 24 then moves to the front to shift the inserting tools and the intermediate clenching tool into register with the punched holes. The inserting tools continue to move toward each other until the eyelets are inserted and clenched, and during the latter stages of such movement the lever 83 is moved to the rear to release, or at least to relieve, the pressure of the clamping jaws 68. As hereinbefore explained, the pressure of these jaws will be entirely or only partly relieved according to whether the collar 89 is adjusted to relieve the compression of the spring 88 wholly or only partially. Assuming, for example, that it is adjusted to maintain a slight compression of the spring 88, and consequently a relatively light pressure of the clamping jaws when the lever 83 is fully retracted, the jaws will exert a light drag on the work when the feed-carriage is subsequently shifted from left to right and will therefore smooth out any wrinkles in the work and otherwise take up slack to insure correct spacing of the eyelets.

Having clenched the eyelets the inserting tools are retracted only far enough to relieve all clenching pressure but not far enough to release the eyelets, and they dwell in a position to hold the eyelets by reason of the dished formation of the eyelet-engaging surfaces while the feed-carriage is shifted from left to right. The work is thus held against retrograde movement but is capable of turning about the axis of the setting tools, so that the work may swing to the demands of the edge gage. This is a novel feature and is an advantage when the edges of the work are curved. When the feed-carriage has reached the right-hand limit of its motion the clamping pressure of the jaws is increased by forward movement of the lever 83. The head 90 of the rod 80 never advances far enough to permit the knee or middle pivot 77 of the toggle to reach the dead center position, but the clamping jaws and toggle members are so organized that the pivot 77 does not need to move to the dead center position to be arrested by the intermediate clamping jaw even when no work is between the jaws. As the pressure of the clamping jaws is increased the inserting tools are separated to retract the spindles 66 from the clenched eyelets, and when said eyelets are fully released the feed-carriage moves from right to left to feed the work. While the work is being fed the tool-carriage 24 is shifted to the rear to place the punches again in punching position and also to place the spindles 66 in register with the eyelets at the delivery end of the raceways. The feed-carriage, on completing its feeding motion, remains stationary and the clamping jaws maintain a relatively tight clamping pressure to hold the work during the next punching period and the ensuing eyelet-inserting and clenching period.

Having thus described my invention, what I claim as new and desire to secure by Letters Patent of the United States is:

1. A fastener-inserting machine comprising punching mechanism including a laterally movable punching couple, fastener-inserting mechanism including a laterally movable fastener-inserting and clenching couple separate from said punching couple, and mechanism for feeding the work relatively to said couples, said couples being movable alternately to a common working position from positions at opposite sides of said working position.

2. A fastener-inserting machine comprising punching mechanism including a laterally movable group of elements forming a duplex punching organization, fastener-inserting mechanism including a laterally movable group of elements forming a duplex fastener-inserting organization, mechanism for feeding the work relatively to said groups of elements, and mechanism for reciprocating said groups to place them alternately in register with a common working position.

3. A fastener-inserting machine comprising punching mechanism including a punching couple, fastener-inserting mechanism including a fastener-inserting and clenching couple, mechanism for feeding the work relatively to said couples, a carriage by which said couples are carried laterally, and mechanism for moving said carriage periodically to place said couples alternately in a common working position.

4. A fastener-inserting machine comprising duplex punching mechanism including opposed punches, duplex fastener inserting mechanism including opposed fastener-inserting tools separate from said punches, duplex work-feeding mechanism arranged to feed confronting work elements relatively to said punches and said tools, and mechanism for shifting said punches and said tools to place them alternately in a common working position.

5. A fastener-inserting machine comprising a punching tool and a fastener-inserting tool both movable laterally to replace each other at a common working locality, mechanism for operating said tools alternately, two cooperative work-clamping members, and mechanism for moving said members laterally in one direction to feed the work while both of said tools are retracted from the work and in the opposite direction while one of said tools is engaged with the work.

6. A fastener-inserting machine comprising duplex punching mechanism and duplex fastener-inserting mechanism arranged to punch holes and insert fasteners at a common working locality in two confronting work elements, means arranged to clamp both of said work elements simultaneously, and mechanism arranged to operate said clamping means to feed said work elements relatively to said punching mechanism and said fastener-inserting mechanism for the purpose of spacing successive fasteners.

7. An eyeleting machine comprising a punch and a separate eyelet-inserting tool, mechanisms for operating them to punch a hole and set an eyelet at a common locality, and work-feeding mechanism including work-clamping members by which the work is held stationary between the punching and eyelet-setting operations and by which the work is fed after the eyelet-setting operation.

8. A fastener-inserting machine comprising duplex punching mechanism arranged to operate on two confronting work elements, duplex fastener-inserting mechanism separate from said punching mechanism but arranged to insert and clench fasteners at the punching locality, work-clamping mechanism arranged to hold said work-elements stationary between the punching and fastener-inserting operations, and mechanism for operating the work-engaging elements of said clamping mechanism to feed the work between the fastener-inserting operation and the next succeeding punching operation.

9. A fastener-inserting machine comprising a punch and a fastener-inserting tool arranged side by side, mechanisms for operating them to punch a hole and insert a fastener at a common locality, cooperative clamping members controlled to clamp the work continuously to hold it stationary between the punching and inserting operations, and mechanism for reciprocating said clamping members toward and from said locality to feed the work, said inserting tool being controlled to hold the work stationary while said clamping members are moving away from said locality.

10. An eyeleting machine comprising a tool-carriage, cooperative punching tools and cooperative eyelet-setting tools carried side by side by said carriage and arranged in duplex relation to operate on two confronting work elements, mechanisms for operating said tools and said carriage to punch holes and set eyelets at a common locality, and mechanism for feeding the work relatively to said tools.

11. An eyeleting machine comprising duplex punching mechanism to operate on two confronting work elements, fixed raceways in duplex relation, duplex eyelet-setting mechanism including eyelet-inserting tools having spring-pressed spindles for picking eyelets from said raceways, said mechanisms being organized to punch the holes and set the eyelets at a common locality, and mechanism for feeding the work relatively to said tools.

12. A dulex eyeleting machine comprising duplex punching mechanism, duplex eyelet-setting mechanism and duplex work-feeding mechanism each having three cooperative work-engaging members arranged to function on two confronting work elements, said work-engaging members of said feeding mechanism being movable to feed the work relatively to said work-engaging members of said punching mechanism and those of said eyelet-setting mechanism, and means for shifting said work-engaging members of said punching mechanism and those of said eyelet-setting mechanism to place them alternately in a common working position.

13. A fastener-inserting machine comprising punching mechanism and fastener-inserting mechanism arranged to function alternately at one locality, and work-feeding mechanism including cooperative work-clamping members operated to move toward said locality to feed the work, said clamping members being also movable away from said locality and said fastener-inserting mechanism being operated to hold the work stationary while said clamping members are moving away from said locality.

14. A fastener-inserting machine comprising duplex punching mechanism and duplex fastener-inserting mechanism arranged to function alternately at one locality, and duplex work-feeding mechanism including three cooperative work-clamping members one of which is arranged to function between two confronting work elements, said clamping members being operated to move toward said locality to feed the work and to move away from said locality between feeding periods and said fastener-inserting mechanism being operated to hold both of said work elements stationary while said clamping members are moving away from said locality.

15. A fastener-inserting machine comprising fastener-inserting mechanism controlled to hold the inserted fastener at the inserting locality through an appreciable period after completing the insertion thereof, cooperative work-clamping members, mechanism for moving said clamping members away from said locality during said period and thereafter toward said locality to feed the work, and mechanism for controlling the clamping effect of said members, said controlling mechanism including regulatable means by which the clamping effect may be maintained or discontinued during said period.

16. A fastener-inserting machine comprising punching mechanism, fastener-inserting mechanism and work-feeding mechanism organized to perform the punching, inserting and feeding operations in the order recited, and the feeding mechanism comprising cooperative work-clamping members arranged to move toward the inserting locality while feeding the work.

17. A fastener-inserting machine comprising punching mechanism, fastener-inserting mechanism and work-feeding mechanism organized to perform the punching, inserting and feeding operations in the order recited, said punching mechanism and fastener-inserting mechanism being arranged to function separately at a common locality, and said feeding mechanism comprising work-clamping means controlled to hold the work stationary between the punching and inserting operations.

18. A fastener-inserting machine comprising punching mechanism, fastener-inserting mechanism and work-feeding mechanism organized to perform the punching, inserting and feeding operations in the order recited, said feeding mechanism being effective to tension the work while the latter is held by the inserting mechanism.

19. An eyeleting machine comprising duplex punching mechanism, duplex eyelet-setting mechanism and duplex work-feeding mechanism organized to perform the punching, setting and feeding operations in the order recited on two confronting work elements, said feeding mechanism being effective to tension both of said work elements while they are held by one of the other said mechanisms.

20. An eyeleting machine comprising punching mechanism, eyelet-setting mechanism and work-feeding mechanism organized to perform the punching, setting and feeding operations in the order recited, the work-engaging elements of said feeding mechanism being movable away from the setting locality while the work is held by the setting mechanism and being movable toward said locality to feed the work.

21. An eyeleting machine comprising duplex punching mechanism, duplex eyelet-setting mechanism and duplex work-feeding mechanism organized to perform the punching, setting and feeding operations in the order recited, and fixed raceways for supplying eyelets, said setting mechanism including inserting tools each having a spring-pressed spindle for transferring an eyelet from a raceway to the work.

22. An eyeleting machine comprising punching mechanism, a raceway the delivery end of which is fixed, eyelet-setting mechanism including an eyelet-inserting tool having a spring-pressed spindle, mechanism for shifting the punch and said tool in unison to transfer an eyelet from the raceway to the punched hole, and mechanism for feeding the work relatively to the punch and said inserting tool.

23. A fastener-inserting machine comprising a punching couple and a fastener-inserting couple arranged side by side, mechanism arranged to shift said couples from side to side, means arranged to operate a member of said punching couple to form a hole in the work, means arranged to supply a fastener to a member of said fastener-inserting couple while said punching couple is functioning, and means for operating said fastener-inserting member.

24. A fastener-inserting machine comprising a tool-guiding member, a punch and a fastener-inserting tool arranged to slide side by side in said member, said member being movable to shift said punch and inserting tool laterally to and from an operating locality common to both, a punch-block and a clenching tool carried by said member in co-operative relation to said punch and said inserting tool respectively, and means for feeding the work relatively to said punch and tool.

25. A fastener-inserting machine comprising fixed guiding means, a tool-carriage arranged to slide on said means, a pair of punches and a pair of fastener-inserting tools organized in duplex relation and arranged to slide side by side in said carriage, and mechanism for feeding the work relatively to said punch and tool.

26. A fastener-inserting machine comprising a fastener-inserting tool and an anvil arranged to co-operate, means movable to and fro to feed the work step by step relatively to said tool and anvil, an edge-gage carried by said means to move with the work during the feeding of the latter, and mechanism arranged to operate said tool to insert and clench a fastener and thereafter to hold the clenched fastener loosely during the counter movement of said feeding means so that the work will be free to swing about the axis of said fastener.

27. A fastener-inserting machine comprising two pairs of fixed guide-rods extending at right angles to each other, work-feeding means arranged to slide lengthwise on the rods of one of said pairs, a tool-carriage arranged to slide lengthwise on the rods of the other said pair, and a punch and a fastener-inserting tool arranged to slide side by side in said tool-carriage.

28. A fastener-inserting machine comprising a pair of fixed guide-rods spaced apart, a tool-carriage arranged to slide thereon, punching and fastener-inserting tools carried by said carriage, fixed guiding means arranged between and extending transversely of said guide-rods and supported at both ends, and work-feeding means arranged to slide on said guiding means to feed the work transversely of the movements of said tool-carriage.

29. A fastener-inserting machine comprising a punch and a fastener-inserting tool arranged side by side, two levers for operating said punch and inserting tool respectively, mechanism for feeding the work relatively to said punch and tool, the axes of said levers being substantially parallel to the lines of work-feed, mechanism for shifting said punch and tool transversely of said lines of work-feed, and links pivotally connecting said punch and tool to said levers respectively to maintain positive operating connections with respect to both directions of reciprocatory movement and to provide for shifting the punch and tool as aforesaid.

30. A duplex eyeleting machine comprising duplex eyelet-setting mechanism including two tools for inserting eyelets in two confronting work elements, duplex mechanism for feeding said work elements relatively to said tools, and two fixed raceways for supplying eyelets, said tools being movable to transfer the eyelets from said raceways to the work.

31. A machine comprising mechanism for performing successive operations on an article of work, means arranged to maintain continuous clamping action on the work, means arranged to shift said clamping means relatively to the work and to feed the work intermittently by reciprocating said clamping means, and means arranged to separate the work-engaging elements of said clamping means to receive the work.

32. A machine comprising mechanism for performing successive operations on an article of work, spring-stressed means arranged to maintain continuous clamping action on the work, means arranged to shift said clamping means relatively to the work and to feed the work intermittently by reciprocating said clamping means, and means arranged to regulate said clamping means automatically to effect relatively heavy clamping pressure during the feeding stroke and relatively light pressure during the counter stroke.

33. A fastener-inserting machine comprising fastener-inserting mechanism, means adapted to maintain continuous clamping pressure on the work, mechanism for moving said clamping means in one direction to feed the work and in the opposite direction while the work is held by said inserting mechanism, and manually operable means for separating the work-engaging elements of said clamping means.

In testimony whereof I have signed my name to this specification.

PERLEY R. GLASS.